(12) United States Patent
Eiermann et al.

(10) Patent No.: US 8,268,091 B2
(45) Date of Patent: Sep. 18, 2012

(54) DISH WASHING MACHINE COMPRISING A DEVICE FOR STORING WASHING LIQUID

(75) Inventors: Rüdiger Eiermann, Syrgenstein (DE); Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1700 days.

(21) Appl. No.: 10/580,594

(22) PCT Filed: Nov. 26, 2004

(86) PCT No.: PCT/EP2004/053113
§ 371 (c)(1),
(2), (4) Date: Mar. 12, 2007

(87) PCT Pub. No.: WO2005/051158
PCT Pub. Date: Jun. 9, 2005

(65) Prior Publication Data
US 2007/0267048 A1   Nov. 22, 2007

(30) Foreign Application Priority Data
Nov. 27, 2003 (DE) .................................. 103 55 429

(51) Int. Cl.
*B08B 3/00* (2006.01)
(52) U.S. Cl. ............................ 134/58 D; 134/56 D; 15/1
(58) Field of Classification Search ..... 134/56 R–58 DL
See application file for complete search history.

(56) References Cited

U.S. PATENT DOCUMENTS

| 3,029,838 A | 4/1962 | Houser |
| 4,561,110 A * | 12/1985 | Herbert ........................ 604/408 |

FOREIGN PATENT DOCUMENTS

| DE | 30 21 746 | * 12/1981 |
| DE | 42 33 643 | 4/1994 |
| DE | 198 12 942 | 9/1999 |
| DE | 198 35 722 | * 2/2000 |
| EP | 0 546 348 | * 6/1993 |
| EP | 0 607 628 | 7/1994 |

(Continued)

OTHER PUBLICATIONS

Definition of fold, Cambridge Dictionaries Online.*

(Continued)

*Primary Examiner* — Michael Kornakov
*Assistant Examiner* — Eric Golightly
(74) *Attorney, Agent, or Firm* — James E. Howard; Andre Pallapies

(57) ABSTRACT

A dish washing machine configured to consume the smallest possible amount of water has a device for storing the washing liquid, in which at least one storage reservoir is provided that is made of a flexible material for holding at least a portion of the washing liquid located inside the dish washing machine. The dish washing machine offers the possibility of removing, at any time during the washing program, at least a portion of the washing bath from the washing circuit, of storing it in the storage reservoir and, when needed, of supplying it once again to the washing circuit. Thus, for example, after completing the last clear rinsing cycle, the washing bath is at least partially retained in the storage reservoir until use of the bath in a subsequent washing cycle, whereby by and large reducing the consumption of water of the dish washing machine.

3 Claims, 2 Drawing Sheets

FOREIGN PATENT DOCUMENTS

Figure 1:
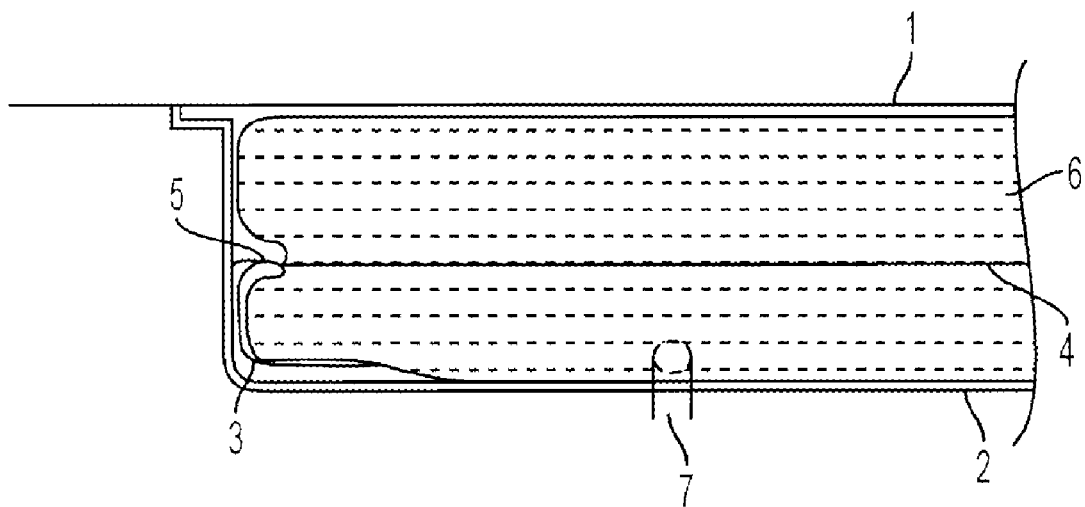

| | | |
|---|---|---|
| EP | 0 669 097 | 8/1995 |
| EP | 0 691 099 | 1/1996 |
| EP | 0 800 785 | 10/1997 |
| EP | 0 914 799 | 5/1999 |
| GB | 2 139 083 * | 11/1984 |
| WO | WO 96/11859 | 4/1996 |

OTHER PUBLICATIONS

Machine Translation of Andrea (DE 198 35 772) by Google Translate.*

International Search Report PCT/EP2004/053113.

* cited by examiner

DISH WASHING MACHINE COMPRISING A DEVICE FOR STORING WASHING LIQUID

BACKGROUND OF THE INVENTION

The invention relates to a dishwashing machine comprising a device for storing washing liquid.

In a dishwashing machine usually one or more washing processes are carried out in the course of the washing operation in order to clean the items to be washed located in the dishwasher. In order to achieve the best possible cleaning effect, a so-called pre-wash cycle is usually provided in the washing program especially in the case of severely contaminated items to be washed. In this case, the coarse contaminants are first removed from the items to be washed by means of a first washing solution and after the end of the pre-wash cycle, these are removed from the dishwashing machine together with the first washing solution. New washing liquid is then supplied to the dishwashing machine to carry out further washing processes with the fresh washing solution.

These washing programs in known dishwashers have the disadvantage that the washing solution used for the pre-wash cycle is severely contaminated after relatively short use, is therefore no longer suitable for subsequent washing processes and is discarded after the end of the pre-wash cycle which results in a high water requirement in dishwashing machines according to the prior art. It is an object of the present invention to eliminate this disadvantage of known dishwashing machines and provide a dishwashing machine with a method for its operation which allows the water consumption to be reduced.

BRIEF SWUMMARY OF THE INVENTION

The object is solved according to the present invention by a dishwashing machine having a device for storing washing liquid, wherein at least one storage container made of a flexible material is provided for receiving at least a portion of the washing liquid provided in the dishwasher.

The dishwashing machine according to the invention also offers the possibility of removing at least a portion of the washing solution from the washing cycle at any time during the washing program, storing it in said storage container and supplying it back to the washing cycle of the dishwashing machine as required. In this way, in the dishwashing machine according to the invention, for example, after the end of the last clear rinsing cycle, the washing solution can be accommodated at least partly in the storage container so that said washing solution can be held therein for use in a following washing cycle. The dishwashing machine according to the present invention thus offers the advantage that the washing solution which was used during the clear rinsing process for example and is only slightly contaminated in this case, can be re-used for example for a following pre-wash cycle whereby the overall water consumption of the dishwashing machine is reduced.

The washing solution used during the clear rinsing cycle undergoes very little contamination during the clear rinsing cycle since the contamination of the items to be washed has already been largely removed by the previous washing cycles. Consequently, at the end of the clear rinsing phase a washing solution which is still relatively clean is present in the dishwashing machine. Since not necessarily fresh washing liquid supplied from the mains needs to be used for the pre-wash cycle but slightly contaminated washing liquid can easily be used without impairing the cleaning effect, the washing solution used during a clear rinsing cycle can be re-used for a following pre-wash cycle.

In a preferred embodiment of the present invention, the storage container is formed from a film bag made of flexible material. The construction of the storage container from a film bag firstly has the advantage that the storage container can be accommodated in non-uniform spaces in the dishwashing machine and nevertheless during filling with washing liquid, can automatically expand into narrow joints or gaps and thus optimally utilise the available space. Secondly, the storage container formed from a film bag of flexible material can be installed in one of the last sections of the process for manufacturing the dishwashing machine. In this case, the flexible storage container can in turn be accommodated in non-uniform or angular spaces in the dishwashing machine. As a result of the flexibility of the film container, this can even be installed subsequently in the dishwashing machine without major structural modifications needing to be made to the dishwashing machine.

The storage container can be made of a plastic or metal film, especially of aluminum. Care should be taken to ensure that the film from which the storage container is made has sufficient elasticity so that during filling with washing liquid, the storage container can expand into joints and gaps but also possesses permanent strength in order to prevent time-dependent or friction-induced leaks. Of course, the storage container can be made of a film having neither plastic nor metal.

In a further embodiment of the present invention, the storage container has at least one fold, preferably directed into the interior of the storage container. As a result of one or a plurality of folds, the storage container can expand more easily into joints and gaps in the manner of bellows during filling with washing liquid. One or a plurality of folds can run completely around the circumference of the storage container and be closed in itself or only one or a plurality of folds can run around the circumference of the storage container. Alternatively or additionally one or a plurality of folds can be provided in only one area of the storage container. Further embodiments of the invention may include a fold not directed into the interior of the storage container.

In an additional embodiment, as a result of using flexible and preferably elastic material, the storage container has a capability for spatial variation. As a result, ventilation of the storage container, e.g. during filling with washing liquid and emptying is advantageously not necessary.

In order to achieve a shape of the storage container which differs from a balloon-shaped configuration, the storage container is preferably made of a plurality of portions which are joined together, these being glued or welded together for example by means of joining seams or welded seams. In this case, it is especially advantageous if at least one joining seam or welded seam runs at least partly along a fold of the storage container. In this way, the loading of the joining seam or welded seam when the level of the storage container is high is kept as low as possible and any tearing of the storage container in the area of the joining seams is avoided. The stability of the joining seam or welded seam can be further improved if the fold in which the joining seam or welded seam runs is directed into the interior of the storage container.

The location in the installation area of a dishwashing machine is usually extremely restricted. As a result of its flexibility, the storage container can be accommodated in narrow or angular spaces. In one embodiment of the dishwashing machine according to the present invention, at least one storage container is disposed between an outer wall of the dishwashing machine and an outer wall of a washing container of the dishwashing machine. Residual spaces into which the flexible storage container can expand during filling with washing liquid are frequently located in this area of the dishwashing machine.

In order to ensure complete filling and emptying of the storage container, in a further preferred embodiment, at least one opening for passing in or passing out washing liquid is located in the lower area of the storage container. The arrangement of at least one opening for passing in or passing out washing liquid in the lower area of the storage container also has the effect that washing residue entrained in the washing liquid, which can settle during retention of the washing liquid in the storage container, does not remain in the storage container but can be entrained when the washing liquid is passed out from the storage container. The filling or emptying of the washing liquid into or from the storage container is effected either by means of the circulating pump of the dishwashing machine or by means of a separate pump.

In an especially advantageous embodiment of the present invention, the opposing faces of the storage container are preferably interconnected at a plurality of points in order to limit the bulging of the storage container when filled. In this case, the opposing faces of the storage container can both be glued or welded together directly in the manner of a stitch-weld or they can be joined together by means of preferably flexible spacers. The spacers can, for example, consist of threads of certain length which limit the spacing between the opposing faces of the storage container, especially when filled.

The washing liquid used during the clear rinsing cycle is usually heated to high temperatures of up to 60° C. and thus entrains a high thermal energy. In order to reduce this thermal energy as rapidly as possible, in a further embodiment, the storage container is in heat-conducting contact with an outer wall of the dishwashing machine. This can be accomplished for example by the storage container abutting directly against the inside of the outer wall of the dishwashing machine. As a result, the washing liquid stored in the storage container delivers its thermal energy to the surroundings via the outer wall of the dishwashing machine.

Alternatively, an attempt can be made to keep the thermal energy of the washing liquid retained in the storage container as long as possible in order to keep the energy expenditure for heating the washing liquid in a following pre-wash cycle as low as possible. In this case, it is advantageous if the storage container is substantially thermally insulated compared with its surroundings. The dimensions of the storage container constructed as a film bag are for example, about 30×40×10 cm.

The aforesaid object is further solved according to the present invention by a method for operating a dishwashing machine comprising a device for storing washing liquid in one of the embodiments described above, in a first step of the method the washing liquid present in the dishwashing machine at the end of a washing cycle is at least partly removed from the washing liquid cycle of the dishwashing machine and fed into the storage container. In a second step of the method according to the invention, at the beginning of a following washing cycle, the washing liquid held in the storage container is at least partly removed from the storage container and fed back to the washing liquid cycle of the dishwashing machine.

As has already been mentioned, it is particularly advantageous if, in the method according to the invention, the washing liquid present in the dishwashing machine at the end of the last clear rinsing cycle of a washing program is at least partly removed from the washing liquid cycle of the dishwashing machine and fed into the storage container and at the beginning of the pre-wash cycle of a following washing program, is at least partly removed from the storage container and fed back to the washing liquid cycle of the dishwashing machine. In this way, no fresh water or only a portion of the washing liquid required needs to be supplied from the mains whereby the water consumption of the dishwashing machine is reduced.

BREIF DESCRIPTION OF THE DRAWINGS

Figure 2:
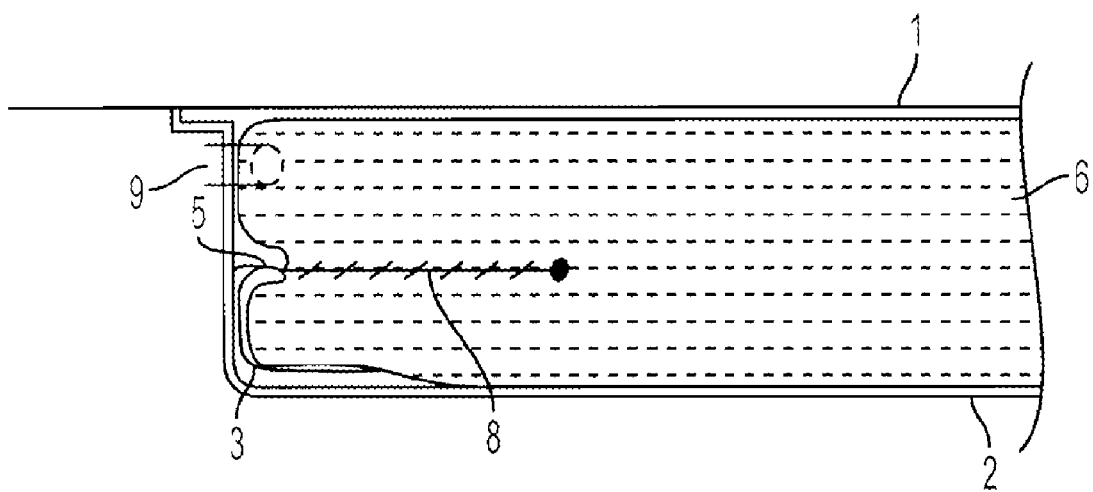

These and other features of this disclosure will be more readily understood from the following detailed description of the various aspects of the disclosure taken in conjunction with the accompanying drawings that depict various embodiments of the disclosure, in which:

FIG. 1 shows a partial sectional view from above through a device for storing washing liquid according to an exemplary embodiment of the present invention, attached to an outer or side wall of a dishwashing machine (not shown); and FIG. 2 shows a partial sectional view from above through a device for storing washing liquid according to another exemplary embodiment the present invention.

DETAILED DESCRIPTION OF EXEMPLARY EMBODIMENTS OF THE PRESENT INVENTION

The dishwasher device according to the invention shown in FIGS. 1 and 2, where like item numbers represent like elements between the drawings, has a side wall 1 on whose inside a retaining metal sheet 2 is mounted. The side wall 1 together with the retaining sheet 2 forms a space in which a storage container 3 is accommodated. In the state shown in FIGS. 1 and 2, the storage container 3 is filled with washing liquid 6. The storage container 3 takes on this state, for example, when after the end of the last clear rinsing cycle in the washing program the washing solution is at least partly accommodated in the storage container to be held therein before being used in a following washing cycle at the beginning of a new washing program. In this way, in a dishwashing machine comprising a device for storing the washing liquid 6 according to the present invention, the washing solution 6 which had been used during a clear rinsing cycle for example and had undergone only slight contamination in this case, can be re-used for a following pre-wash cycle.

In the embodiment shown in FIG. 1, the storage container 3 has a fold 4 directed into the interior of the storage container 3. The fold 4 runs completely around the circumference of the storage container approximately at the centre of the storage container 3 and is closed in itself. As a result of the fold 4, during the filling with washing liquid 6 the storage container 3 can expand in a bellows fashion in the space defined by the side wall 1 and the retaining metal sheet 2. In the embodiment shown in the FIG. 2, the storage container 3 may have a fold 8 not directed into the interior of the storage container 3 and provided in only one area of the storage container which also allows for expanding in a bellows fashion.

The storage container 3 is fabricated from a plurality of portions which are interconnected by gluing or welding together by means of a joining seam or weld seam 5. In this case, the joining seam or weld seam 5 runs at least partly along the fold 4 of the storage container 3. In this way, the loading of the joining seam or welded seam 5 when the level of the storage container 3 is high is kept as low as possible and any tearing of the storage container 3 in the area of the joining seam 5 is avoided. The stability of the joining seam or welded seam 5 can be further improved if the fold 4 in which the joining seam or welded seam 5 runs is directed into the interior of the storage container 3.

In the embodiment shown in FIGS. 1 and 2. the storage container 3 is in heat-conducting contact with an outer wall 1 of the dishwashing machine, the storage container 3 abutting directly against the inside of the outer wall 1 of the dishwashing machine. As a result, the thermal energy of the washing liquid 6 stored in the storage container 3 is delivered to the surroundings by means of the outer wall 1 of the dishwashing machine.

However, it is desired to keep the thermal energy of the washing liquid 6 retained in the storage container 3 as long as possible in order to keep the energy expenditure for heating the washing liquid 6 in a following pre-wash cycle as low as possible, the storage container 3 can advantageously be thermally insulated towards its surroundings by means of a suitable insulating layer (not shown).

The device for storing washing liquid 6 shown in FIGS. 1 and 2 can be used to execute a method for operating a dishwashing machine according to the present invention wherein in a first step at the end of a washing cycle, the washing liquid 6 present in the dishwashing machine is at least partly removed from the washing liquid cycle of the dishwashing machine and fed into the storage container 3 and in a second step, at the beginning of a following washing cycle, the washing liquid held in the storage container 3 is at least partly removed from the storage container 3 and fed back to the washing liquid cycle of the dishwashing machine.

In the embodiment shown in FIG. 1, the filling and emptying of the storage container 3 is effected in each case by means of at least one opening 7 in the storage container 3. In order to ensure complete filling and emptying of the storage container 3, the opening 7 for passing in or passing out washing liquid is provided in the lower area of the storage container 3. In this way, any washing residue entrained in the washing liquid, which can settle during retention of the washing liquid in the storage container, can be removed when the washing liquid is passed out from the storage container 3. The filling and emptying of the washing liquid 6 into or from the storage container 3 is effected by means of a pump, using either the pumping capacity of the circulating pump of the dishwashing machine or a separate pump being provided for this purpose. In other embodiments of the invention as shown in FIG. 2, an opening 9 may he provided in another area of the storage container 3.

Reference List
1 Outer wall of dishwashing machine
2 Retaining metal sheet
3 Storage container or film bag
4 Fold in storage container 3
5 Joining seam or weld seam
6 Washing liquid in storage container 2

The invention claimed is:

1. A dishwashing machine comprising:
a washing container for retaining therein items to be washed; and at least one storage container for storing washing liquid, the at least one storage container being comprised of a flexible material and having a storage capacity to accommodate at least a portion of the washing liquid present in the dishwasher, wherein the at least one storage container has at least one fold that is a selected one of a fold directed into the interior of the storage container and a fold not directed into the interior of the storage container.

2. The dishwashing machine according to claim 1, wherein the at least one storage container has a selected one of a first fold set including at least one fold with each respective fold of the first fold set running completely around the circumference of the storage container, a second fold set including at least one fold with all respective folds of the second fold being provided in only one area of the at least one storage container, and a third fold set including at least one fold running completely around the circumference of the storage container and at least one fold being provided in only one area of the at least one storage container.

3. The dishwashing machine according claim 2, wherein at least one joining seam or welded seam runs at least partly along a fold of the storage container.

* * * * *